(12) United States Patent
Vitenberg et al.

(10) Patent No.: US 6,351,509 B1
(45) Date of Patent: Feb. 26, 2002

(54) METHOD AND APPARATUS FOR REDUCING POWER CONSUMPTION OF DIGITAL SUBSCRIBER LINE MODEMS

(75) Inventors: Roman Vitenberg, Hulon; Liron Frenkel, Natania; Victor Koren, Rishon-le-Zion, all of (IL)

(73) Assignee: Tioga Technologies Ltd., Tel Aviv (IL)

( * ) Notice: Subject to any disclaimer, the term of this patent is extended or adjusted under 35 U.S.C. 154(b) by 0 days.

(21) Appl. No.: 09/471,895

(22) Filed: Dec. 23, 1999

(51) Int. Cl.⁷ .............................................. H04L 23/00
(52) U.S. Cl. ........................ 375/377; 375/219; 375/222; 375/229
(58) Field of Search ................................. 375/222, 377, 375/229, 285, 260, 295, 219; 330/297; 326/83

(56) References Cited

U.S. PATENT DOCUMENTS 5,787,113 A * 7/1998 Chow et al. ................ 375/219
6,100,717 A * 8/2000 May ............................ 326/83

* cited by examiner

*Primary Examiner*—Stephen Chin
*Assistant Examiner*—Shu Wang Liu
(74) *Attorney, Agent, or Firm*—Darby & Darby (57) ABSTRACT

A system and method is presented for reducing the power consumed by a line driver driving a signal to be transmitted through a communications media. The preferred method includes the steps of: (1) delaying the signal; (2) determining whether the signal has reached a predetermined threshold value; (3) increasing power supplied to the line driver in response to an indication from the determining step that the threshold has been reached; and (4) delivering the delayed signal to the line driver. The preferred system includes: (1) a digital signal processor; (2) a line driver; (3) a digital delay line disposed between the digital signal processor and the line driver; and (4) a power regulator disposed between the threshold detector and the line driver. The system and method, while applicable to many communications formats, is particularly applicable to communications methods transmitting signals having a relatively large dynamic range, such as xDSL communications techniques.

29 Claims, 7 Drawing Sheets

METHOD AND APPARATUS FOR REDUCING POWER CONSUMPTION OF DIGITAL SUBSCRIBER LINE MODEMS

FIELD OF THE INVENTION

The present invention relates to telecommunications systems and, in particular, to a method and system for reducing power consumption in communications modems that utilize multitone signaling techniques.

BACKGROUND OF THE INVENTION

The increased use of Digital Subscriber Line (xDSL) technology occurring over the past several years is expected to continue as higher speed and more robust telecommunication connections for long distance multimedia applications (e.g., Internet) are required. Oftentimes in applications such as the Internet, a bandwidth bottleneck is encountered when a two-wire copper twisted pair connection is utilized as the communications medium between user data communications equipment (e.g., a personal computer based modem) and central office data communications equipment. The bottleneck occurs due to the bandwidth constricting nature of two-wire copper twisted pair media as compared to the bandwidth capabilities of fiber-optic media which comprises the backbone of high speed/high bandwidth infrastructures such as the Internet. In the past, the only way to effectively and significantly increase the data transfer rate between user data communications equipment and central office communications equipment was to install a fiber-optic connection between the equipment at both ends.

xDSL technology, including Asymmetric Digital Subscriber Line (ADSL) techniques, has greatly increased the data transfer rate capabilities of existing two-wire copper twisted pair connections. ADSL modems utilize digital signal processing methods and algorithms which utilize a multitone signaling technique known as discrete multitone signaling (DMT), a variant of frequency multitone signaling (FMT).

DMT signals have a relatively large dynamic range, e.g., a peak signal may have an amplitude that is seven times the RMS value of the DMT signal. In other words, DMT signals produce large peaks relative to the overall signal and produce these peaks relatively infrequently (e.g., 5 peaks per second). For typical ADSL down-stream communications (i.e., from central office to end-user), the amplitude of the peak signals is around +/−20 volts while the RMS of the DMT signal is around +3 volts. Nevertheless, regardless of the infrequency of their occurrence, these large peaks must be transmitted and received accurately in order to avoid signal distortion. Consequently, ADSL modems must continuously drive DMT signals at relatively high power levels in order to transmit the signal peaks so that the entire signal can be faithfully reproduced at a receiving ADSL modem.

Accordingly, line drivers of typical ADSL modems utilize power inefficiently because they must continually drive the DMT signal at high power even though only the signal peaks need to be driven as such. While the inefficiencies incurred as a result of driving ADSL signals at high power levels do not generally present a problem for an ADSL modem end-user (e.g., an ADSL modem mounted in a home personal computer) who must power only a single modem, regional telephone companies (e.g., RBOCS) and other telecommunications providers must drive multiple ADSL modems (one for each customer) at their central offices.

As an example, a typical central office may provide service to 1000 ADSL subscribers. Consequently, the power consumed by a system driving 1000 ADSL modems can be as high as 2 k Watts.

Various prior art methods and systems have been introduced to decrease power consumption of modems driving signals with high dynamic ranges. These methods are generally divided between analog-based and digital signal processor-based techniques.

Analog-based power reducing techniques include, for example, the use of output impedance synthesis as described by Victor Koren of Orckit Communications, 38 Nahalat Yitzhak Street, Tel Aviv, Israel 67448, in the Jan. 6, 1994 edition of EDN Magazine in an article entitled "Line driver economically synthesizes impedance" which is hereby incorporated herein by reference. Such analog based methods generally utilize signal analysis information obtained via a feedback loop containing various analog circuit components (e.g., resistors) prior to transmission of the ADSL signal. As a result, a significant portion of the power consumed by an ADSL modem using such an analog-based power reducing technique is dissipated in the feedback loop.

Digital signal processor-based power reducing techniques include, for example, a method for adding correcting pulses to a transmitted ADSL signal as described in U.S. Pat. No. 5,835,536 of May et al., entitled "Method and apparatus for reducing peak-to-average requirements in multitone communications circuits" which is hereby incorporated herein by reference. While generally operating more efficiently in terms of power consumption than analog-based methods of the type described above, digital signal processor based methods have the disadvantage of generally requiring that the digital signal processor algorithm operating in a receiving modem be modified in accordance with signal modifications applied at the transmitting modem.

What is desired, therefore, is a system and method that reduces the power consumption of an ADSL modem without consuming additional power and without requiring the receiving modem to be modified in any way.

SUMMARY OF THE INVENTION

The present invention provides a method for reducing power consumption of a modem driving signals having a large dynamic range, e.g., xDSL modems. The preferred method presented includes the steps of: (1) delaying the signal to be driven; (2) determining whether the signal has reached a threshold value; (3) increasing power supplied to a line driver of the modem in response to an indication that the threshold has been reached; and (4) delivering the delayed signal to the line driver.

The present invention also provides a system for reducing power consumption of a modem driving signals having a large dynamic range, wherein the system includes: a digital signal processor, a line driver, a digital delay line disposed between the digital signal processor and the line driver and a threshold detector disposed between the digital signal processor and a power save analog circuit. The power save analog circuit is connected to the line driver and provides a variable power source to the line driver depending upon the state of the threshold detector. The line driver is connected to a transformer which increases the voltage level of the signal transmitted on the DSL communications media. The digital delay line and the threshold detector may be implemented using the digital signal processor. In this way, board space is conserved and known elements and methods for constructing xDSL modems may be utilized.

BRIEF DESCRIPTION OF THE DRAWINGS

Other objects and features of the present invention will be described hereinafter in detail by way of certain preferred embodiments with reference to the accompanying drawings, in which.

DETAILED DESCRIPTION OF THE PREFERRED EMBODIMENT

The embodiments of the present invention hereinafter described generally comprise microprocessor, logic, electronic and power component elements commonly found in ADSL, modems, all of which are known in the art and which are interconnected using methods known in the art.

The system and method disclosed herein reduce power consumption in an ADSL modem by continually monitoring, in real time, a version of a discrete multitone (DMT) signal to be transmitted by the ADSL modem. Contemporaneously, the actual DMT signal to be transmitted is continually delayed for a pre-determined period of time prior to being delivered to a line driver. The system analyzes the real-time version of the DMT signal for the approach of a peak value which indicates that additional power will need to be supplied to transmit the delayed signal. Upon detecting the approach of a peak value, the line driver is supplied with a requisite increased signal, e.g., increased voltage, in order to accommodate the peak of the delayed signal. The delayed version of the DMT signal (including the peak value) to be transmitted is thereafter delivered to the line driver.

Figure 1:
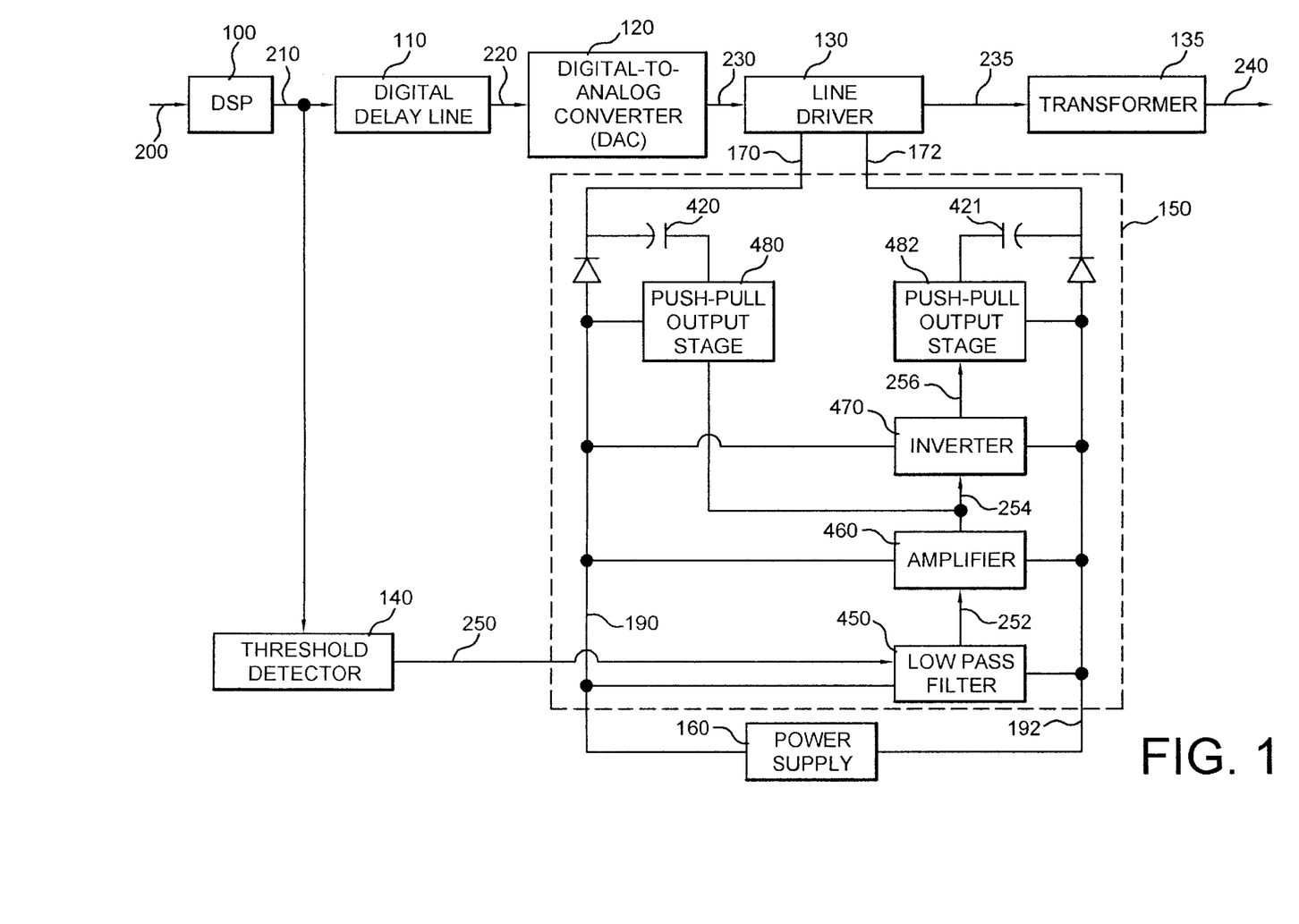
FIG. 1 is a block diagram of an ADSL modem system designed in accordance with the present invention.

Turning to FIG. 1, an illustration of a first embodiment of the present method and system for reducing power consumption in an ADSL modem is shown in block diagram form. The system includes a digital signal processor (DSP) 100 which receives at 200, a bitstream representing voice or data information to be transmitted over an ADSL communications connection medium 240 (e.g., two-wire copper twisted pair). DSP 100 performs the functions normally associated with a digital signal processor in an ADSL modem, the most important function being the real-time translation of an incoming digital bitstream into a digital discrete multitone (DMT) signal 210 using any of the various digital signal processing methods known in the art for accomplishing such conversion.

DSP 100 simultaneously delivers the resulting digital DMT signal 210 to a digital delay line (DDL) 110 and to a digital threshold detector 140. Although DDL 110 and threshold detector 140, are represented in FIG. 1 as separate blocks, it is understood that they may be implemented in DSP 100, e.g., DDL 110 may be implemented using RAM memory integrated into DSP 100 while the functionality of digital threshold detector 140 may be implemented using software programmable logic functions of DSP 100. Alternately, DDL 110 may be implemented as a filter.

Digital DMT signal 210 is delayed at DDL 110 for a time period ($T_1d$). In the preferred embodiment, DSP 100 sets the value of time delay period $T_1d$ to a time sufficient to: 1) allow digital threshold detector 140 to detect the approach of a peak value in digital DMT signal 210; and 2) subsequently allow an increase in the power supplied to a line driver 130 to drive a delayed analog version of digital DMT signal 210. The calculation of $T_1d$ will be further discussed in detail below.

In addition to delivering digital DMT signal 210 to DDL 110, DSP 100 simultaneously delivers DMT signal 210 to threshold detector 140 which monitors digital DMT signal 210 for a threshold value. As is known in the art, DMT signals utilized in ADSL communication systems contain signal components with a high dynamic range (e.g., peak signal=±20 volts, RMS signal=+3 volts). Threshold detector 140 monitors DMT signal 210 for the occurrence of a peak signal by comparing the present value of digital DMT signal 210 with a predetermined threshold value (e.g., half the peak signal amplitude) which normally precedes a peak value. As is known in the art, when threshold detector 140 is preferably implemented using DSP 100, this functionality may be accomplished via software programming of DSP 100 using a two step procedure: (1) an interpolation/filtering stage that predicts the occurrence of estimated signal peaks at line driver 130, and (2) a comparison stage to compare the estimated signal peaks to the threshold value using a COMPARE or equivalent function. Alternately, a discrete threshold detector may be used.

Threshold detector 140 indicates its state via output logic signal 250. In its "normal" state (i.e., when digital DMT signal 210 is below the preset threshold), threshold detector 140 outputs a logic "0" (e.g., 0 volts) as logic signal 250. However, upon detecting that digital DMT signal 210 exceeds the threshold value, threshold detector 140 enters a "high" state and outputs a logic "1" (e.g., 5 volts) as logic signal 250. After reaching the "high" state, threshold detector 140 maintains logic signal "1" for time delay period $T_2d$. The calculation of $T_2d$ will be further discussed in detail below.

With continued reference to FIG. 1, threshold detector 140 delivers logic signal 250 to a power save analog circuit (PSAC) 150 which is disposed between a power supply 160 and line driver 130 and which is controlled by threshold detector 140. PSAC 150 acts as a power regulator to control the power delivered from power supply 160 to line driver 130.

As shown in FIG. 1, PSAC 150 utilizes logic signal 250 to provide power to line driver 130.

With continued reference to FIG. 1, logic signal 250 is connected to the input of a low pass filter 450. Low pass filter 450 is configured to control the shape as well as the rate of change of logic signal 250. As will be discussed in detail below, the rate of change allowed by low pass filter 450 is set relative to the response time of line driver 130. Low pass filter 450 outputs an appropriately shaped logic signal 252, having a voltage range of 0 volts to +5 volts. The active components of low pass filter 450 are powered by a +7.5 volt supply terminal 190 and a −7.5 volt supply terminal 192 of power supply 160.

With continued reference to FIG. 1, appropriately shaped logic signal 252 is output from low pass filter 450 to amplifier 460. Amplifier 460 preferably includes an operational amplifier powered by +7.5 volt supply terminal 190 and −7.5 volt supply terminal 192 of power supply 160. Amplifier 460 receives appropriately shaped logic signal 252 (having a voltage range of 0 volts to +5 volts) from low pass filter 450 and outputs a proportionally amplified signal 254 having a dynamic range of 0 volts to +7.5 volts.

Proportionally amplified signal 254 is input into an inverter 470 to provide a negative proportionally amplified signal 256 having a voltage range of 0 volts to −7.5 volts.

Proportionally amplified signal 254 and negative proportionally amplified signal 256 are respectively input into transistor-configured push-pull output stages 480 and 482. As will be further explained in detail below, transistor-configured push-pull output stages 480 and 482 operate with capacitors 420 and 421, respectively, to provide an additional +7.5 volts and −7.5 volts respectively to supply terminals 170 and 172 of line driver 130 when logic signal 250 is in a high state.

The output of transistor-configured push-pull transistor output stages 480 and 482 are input into the positive and negative terminals (170 and 172 respectively) of line driver 130 such that positive terminal 170 of line driver 130 receives +15 volts of power and negative terminal 172 of line driver 130 receives −15 volts of power when logic signal 250 is in a high state.

Figure 2:
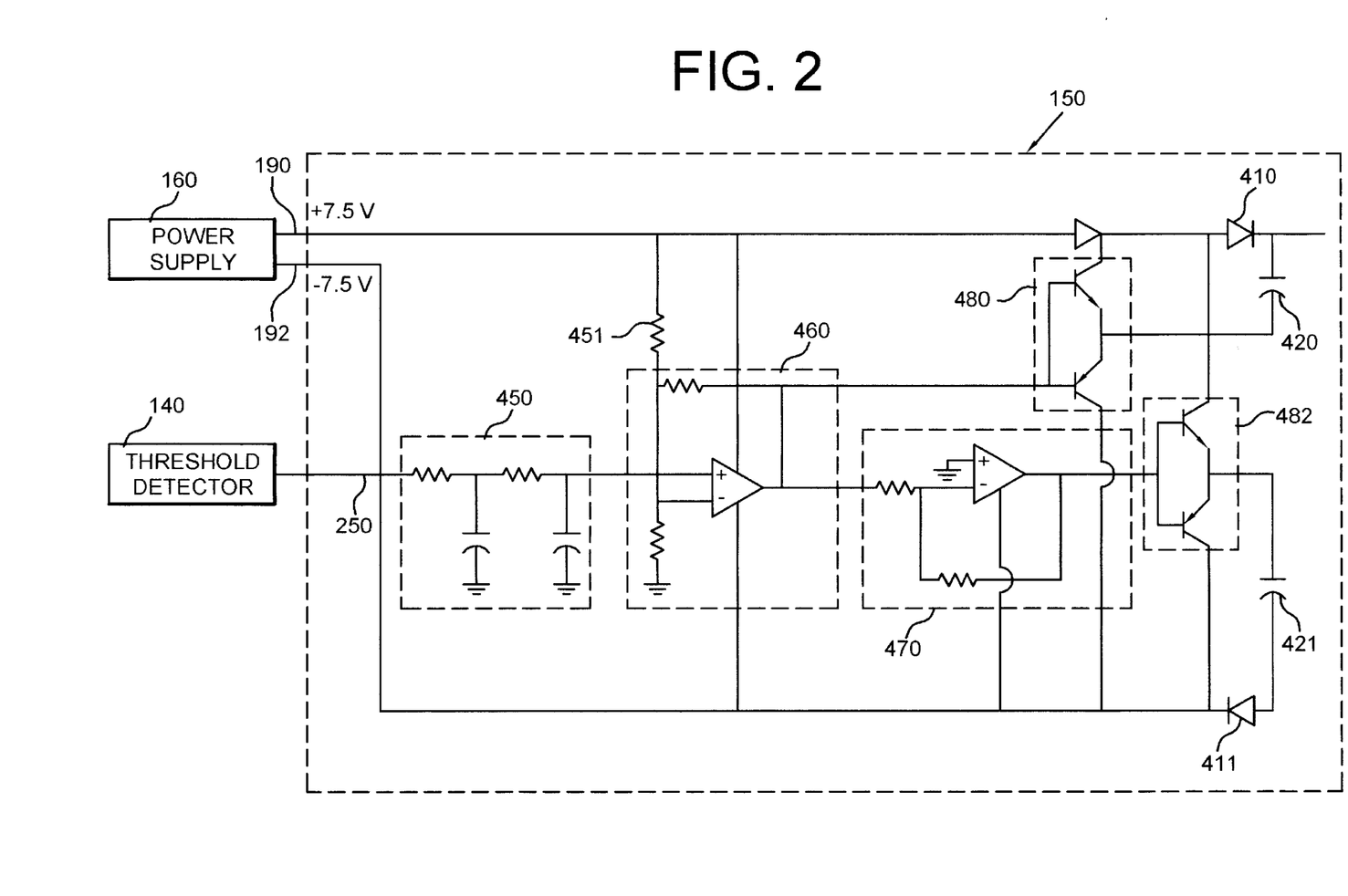
FIG. 2 is a schematic diagram of the power save analog circuit used in the system of FIG. 1.

A component level circuit diagram of the PSAC of FIG. 1 is illustrated in FIG. 2.

As is shown in FIG. 2, PSAC 150 is powered by +7.5 volt supply terminal 190 and −7.5 volt supply terminal 192 of power supply 160. PSAC 150 includes low pass filter 450 formed using passive RC components, amplifier 460 implemented using an operational amplifier and resistors, invertor 470 likewise implemented using an operational amplifier and resistors, and two transistor configured push-pull output stages 480 and 482, each formed using an NPN and PNP transistor combination.

Positive terminal 190 of power supply 160 supplies power to push-pull output stage 480 and through diode 410 to one side of capacitor 420. Negative terminal 192 of power supply 160 supplies power to push-pull output stage 482 and through diode 411 to capacitor 421. The output of threshold detector 140, i.e., logic signal 250, is connected to the input of low pass filter 450. The output of low pass filter 450 is connected to the input of amplifier 460 and the output of amplifier 460 is in turn connected to the input of push-pull output stage 480 and to the input of invertor 470. The output of inverter 470 is connected to the input of push-pull output stage 482. The DC operation point of amplifier 460 is determined by the value of resistor 451.

In accordance with the above, when logic signal 250 is in a normal state, i.e., equal to 0 volts, the output of push-pull output stage 480 is equal to −3.75 volts and capacitor 420 is charged to that value. Conversely, the output of push-pull transistor output stage 482 is equal to +3.75 volts and capacitor 421 is charged to that value. However, when threshold detector 140 changes to a high power state, i.e., equal to 5 volts, the output of push-pull output stage 480 rises slowly from −3.75 volts to +3.75 volts charging capacitor 420 to +7.5 volts. Conversely, the output of push-pull output stage 482 slowly drops from +3.75 volts to −3.75 volts charging capacitor 421 to −7.5 volts. Thus, upon transition of logic signal 250 to a high state, the combined voltage of the power delivered to the positive terminal 170 of line driver 130 is equal to +15 volts (7.5 volts from terminal 190 +7.5 volts from capacitor 420) while the combined voltage of the power delivered to the negative terminal 170 of line driver 130 is equal to −15 volts (−7.5 volts from terminal 192 +−7.5 volts from capacitor 421).

The rise and fall time of the voltages delivered to line driver 130 are adjusted by varying the parameters of the low pass filter 450. The amplitude of the voltages delivered to line driver 130 is adjusted by varying the gain of amplifier 460.

Low pass filter 450 of FIGS. 1 and 2 may alternatively be implemented digitally using any of the methods for digital filtering known in the art. When implemented digitally, low pass filter 450 is followed by a digital-to-analog converter such that the resulting appropriately shaped logic signal 252 that is output by low pass filter 450 is in analog form.

Further when low pass filter 450 is implemented digitally, threshold detector 140 may be configured to output a logic signal 250 having a resolution higher than the previously described two state (i.e., 0 and 1) resolution. As an example, logic signal 250 may include multiple predetermined logic levels corresponding to multiple predetermined threshold values of digital DMT signal 210. Methods and digital components known in the art may be used to produce a logic signal 250 having multiple logic levels.

Figure 3:
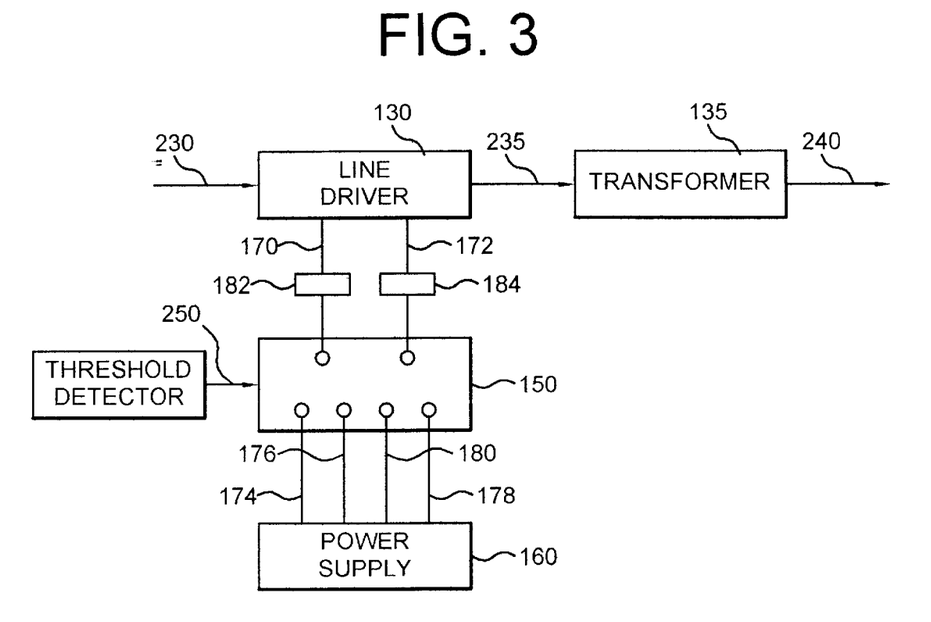
FIG. 3 is a block diagram of an alternative embodiment of the power save analog circuit shown in FIG. 1.

FIG. 3 illustrates an alternative embodiment of the PSAC 150 shown in FIGS. 1 and 2.

As shown in FIG. 3, PSAC 150 includes a 4:2 MOSFET voltage switch where terminals 170 and 172 couple with either terminals 174 and 178 or 176 and 180, respectively, depending upon the value of logic signal 250. (In the illustration of FIG. 3, terminals 170 and 172 are shown coupled with terminals 176 and 180 respectively).

In the preferred embodiment, PSAC 150 connects, at terminals 174,176,178 and 180 to a four-voltage-output power supply 160 capable of supplying ±5 volts and ±15 volts. PSAC 150 and power supply 160 are configured such that the voltage supplied on terminals 170 and 172 are of opposite polarity and equal amplitude. The terminals 170 and 172 provide the appropriate voltage for line driver 130, which drives an analog DMT signal 230 in a voltage range set by input terminals 170 and 172.

In the preferred embodiment, PSAC 150 and power supply 160 are configured such that during normal operation (i.e., logic signal 250 set to "0"), PSAC 150 supplies line driver 130 with normal (i.e., low) voltage (e.g., ±5 volts). However, upon receiving a logic "1" signal from threshold detector 140 (indicating the approach of a peak value), PSAC 150 causes the line driver 130 to be supplied with a higher voltage (e.g., ±15 volts) for a time period equal to $T_2d$.

Analog filters 182 and 184 are preferably utilized to control the rise time of the voltages supplied on terminals 170 and 172.

Figure 4:
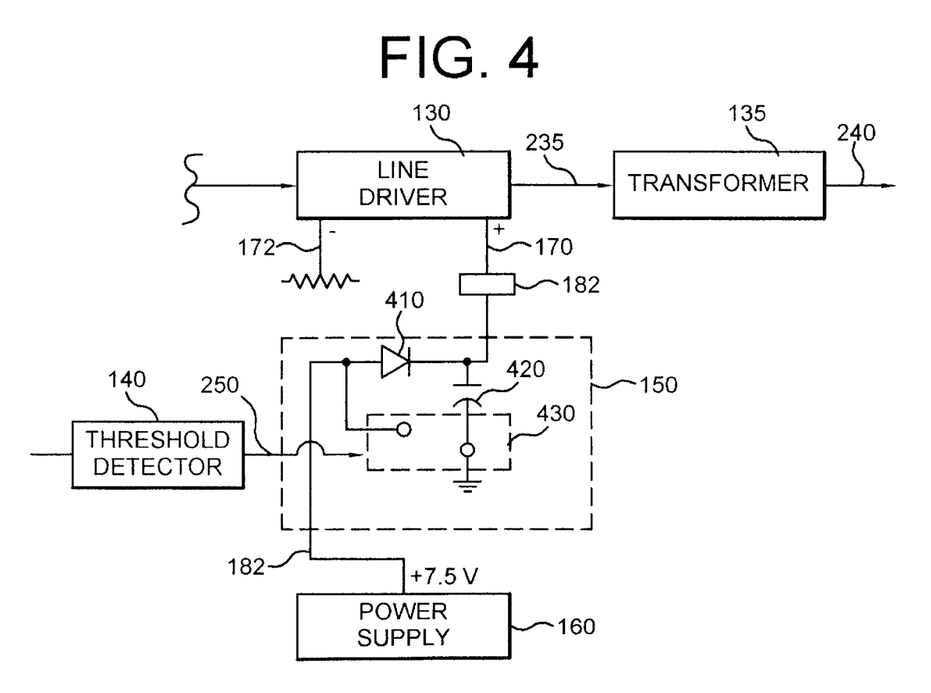
FIG. 4 is a block diagram of yet another alternative embodiment of the power save analog circuit shown in FIG. 1.

FIG. 4 illustrates an alternative embodiment of PSAC 150 and power supply 160. For ease of illustration, only a positive power supply terminal 182 is illustrated.

As is shown in FIG. 4, PSAC 150 is powered by a low voltage power supply 160, e.g., 7.5 volts. Positive terminal 182 of power supply 160 supplies power, through diode 410, to a capacitor 420 and a two terminal switch 430. The position of switch 430 is controlled by the output of threshold detector 140, i.e., logic signal 250. As is shown, diode 410, capacitor 420 and switch 430 are arranged such that when a "0" logic signal 250 is output by threshold detector 140, one plate of capacitor 420 is connected to ground, with the other plate connected to diode 410, causing capacitor 420 to be charged to the supply voltage of +7.5 volts. Capacitor 420 is also connected to the positive input of line driver 130, effectively supplying +7.5 volts to the positive input. When threshold detector 140 outputs a logic signal 250 having a value of "1", switch 430 changes state causing capacitor 420 to have its negative plate connected to the output of power supply 160. In this configuration, capacitor 420 is connected in parallel with diode 410. Also, this configuration, assuming the capacitor to be pre-charged to +7.5 volts, causes the positive plate of the capacitor to rise by an additional 7.5 volts, effectively doubles the voltage delivered to line driver 130 (i.e., +15 volts). Analog filter 182 is used to control the rise time of the voltage supplied on 170.

Although not illustrated, a −7.5 volt terminal of power supply 160 provides power to a second PSAC that provides a similarly configured negative power supply to line driver 130.

In each of the above-described embodiments of PSAC 150 in FIGS. 1–4, the signal output by line driver 130 includes a DMT signal having peak signals of +/−15 volts and an RMS value of +2 volts. The signal output by line driver 130 is delivered, via connection 235, to transformer 135. Transformer 135 increases the voltage of the DMT signal such that the DMT signal delivered to communications connection media 240 has peak signal values of +/−20 volt and an RMS value of 3 volts in conformance with xDSL standards.

Figure 5:
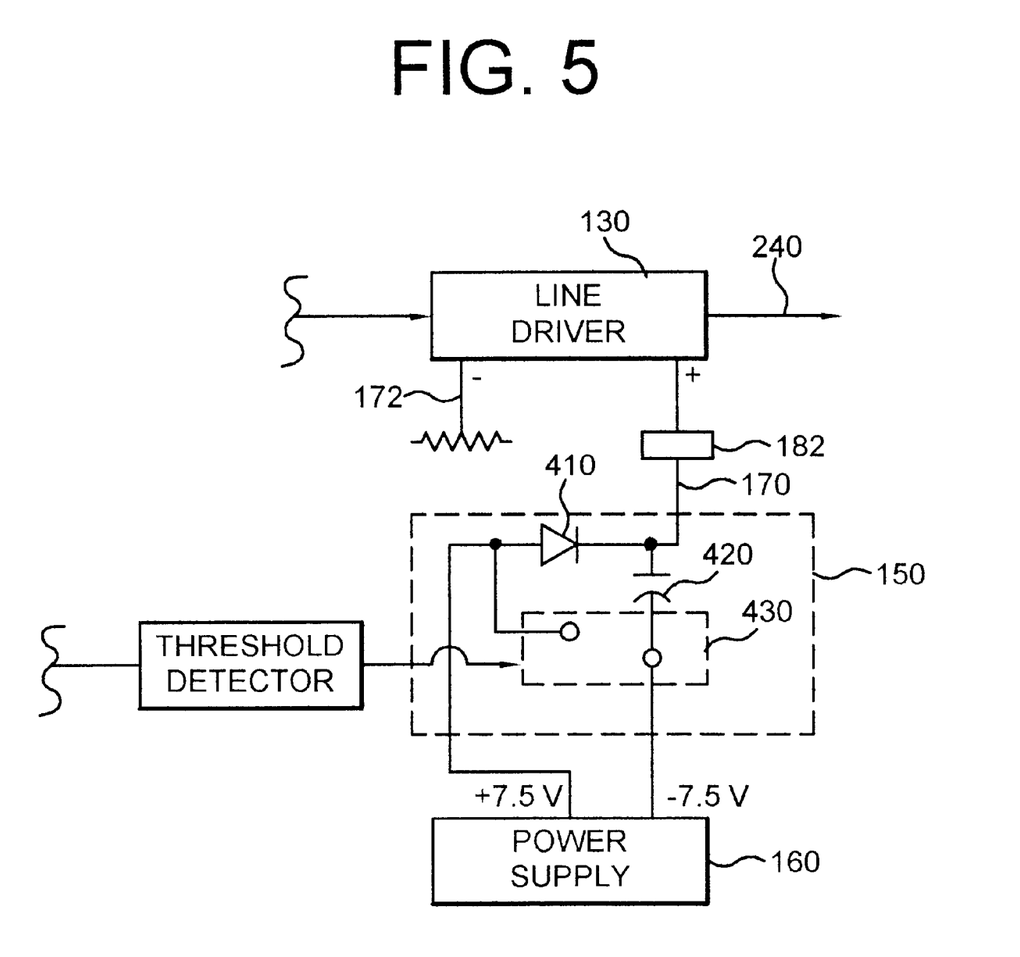
FIG. 5 is a block diagram of an alternative embodiment of the power save analog circuit shown in FIG. 4.

An alternative embodiment of PSAC 150 shown in FIG. 4 is illustrated in FIG. 5 wherein transformer 135 is not needed for purposes of providing an increased voltage for transmission of the DMT signal over communications medium 240. As shown in FIG. 5, the otherwise grounded tenninal of switch 430 of FIG. 4 is connected to a −7.5 volt power supply rather than to ground such that when a "0" logic signal 250 is output by threshold detector 140, one plate of capacitor 420 is connected to −7.5 volts and the other plate of capacitor 420 is connected to diode 410, causing capacitor 420 to be charged to the sum of the supply voltage (+7.5 volts) and the absolute value of the −7.5 volt supply, i.e., −15 volts. Thus, when switch 430 changes state causing capacitor 420 to have its negative plate connected to the output of power supply 160 (+7.5 volts) the total voltage delivered to the line driver is effectively tripled (i.e., +22.5 volts).

Although in the above-described embodiment of PSAC 150 illustrated in FIG. 5, a transformer is not necessary for purposes of providing an increased voltage for transmission of the DMT signal over communications medium 240, a transformer having a 1:1 turn ratio may nevertheless be provided at the output of line driver 130.

The method by which a delayed analog version of digital DMT signal 210 is produced and delivered to line driver 130 for transmission over an ADSL communications link 240 will now be described.

As was previously explained, DSP 100, in addition to delivering digital DMT signal 210 to threshold detector 140, contemporaneously delivers DMT signal 210 to DDL 110. The purpose of delivering DMT signal 210 to DDL 110 is to delay DMT signal 210 by a time delay period ($T_1d$) adequate to allow threshold detector 140 to detect a signal peak and trigger the high power state of PSAC 150 to supply line driver 130 with a higher power supply before the arrival of a peak signal at line driver 130.

Because ADSL signals are transmitted and received via analog electromagnetic signals, a digital-to-analog conversion of the digital DMT signal is necessary before the DMT signal is delivered to line driver 130. Accordingly DDL 110 outputs a delayed digital DMT signal 220 to the input of a digital-to-analog converter (DAC) 120. DAC 120 outputs an analog DMT signal equivalent 230 of delayed digital DMT signal 220. The system utilizes any of the digital-to-analog converters known in the art and preferably utilizes a digital-to-analog converter integrated with DSP 100 if such functionality is available in DSP 100.

Digital-to-analog converters known in the art, whether or not integrated with a digital signal processor, generally do not output a signal of sufficient power to drive a DMT signal over any significant length of communications media. Accordingly DAC 120 delivers delayed analog DMT signal 230 to line driver 130. As described above with respect to the embodiments shown in FIGS. 1–4, line driver 130 amplifies an incoming signal in one of two ranges: a high power range (e.g. ±15 volts) or a normal or low power range (e.g. ±5 volts).

Time delay period $T_1d$, must be set to a time sufficient to: 1) allow digital threshold detector 140 to detect a digital DMT signal 210 exceeding a preset threshold ($T_{threshold\ detect}$), and 2) subsequently allow an increase in the power supplied to line driver 130 ($T_{PSAC}$).

$T_{threshold\ detect}$ is determined by calculating the time needed by threshold detector 140 to perform the steps of comparing a sample of digital DMT signal 210 to the threshold value and subsequently outputting the resulting logic signal 250. $T_{threshold\ detect}$ also includes the time required for the threshold detector to estimate the amplitude of the signal (using filtering and interpolation) for prediction of the signal at the input to the line driver.

$T_{PSAC}$ is estimated by determining the amount of time required by PSAC 150 to respond to a change in its control input (i.e., logic signal 250), and the time needed by line driver 130, to adjust to be able to output higher voltage signals.

Both $T_{threshold\ detect}$ and $T_{PSAC}$ may be determined prior to system implementation using methods known in the art, e.g., empirical determination. Accordingly, the calculation of $T_1d$ may be reduced to the following equation:

$$T_1d = T_{threshold\ detect} + T_{PSAC} \quad (1)$$

Time delay period $T_2d$, must be of a sufficient duration to allow for the arrival of the peak signal at line driver 130. More particularly, $T_2d$ is determined by the rise time of the voltage supplied on terminals 170 and 172. This time should be long enough to ensure that the rate of change of the supply voltage to line driver 130 is relatively slow. A slow rise time insures that the change of power supplied to line driver 130 does not significantly impair delayed analog signal 230 as discussed above with reference to $T_{PSAC}$. The rise time of the voltage supplied on terminals 170 and 172 may be set and regulated by low pass filter 450 when using the preferred embodiment of PSAC 150 illustrated in FIG. 1 and by analog filters 182 and 184 placed between PSAC 150 and line driver 130 when using the embodiment of PSAC 150 illustrated in FIGS. 3 through 5.

The duration of $T_2d$ may also be set as a function of the amplitude of the DMT signal to be transmitted. The system may dynamically adjust $T_2d$ with respect to the amplitude of the predicted signal currently being processed. Thus, for example, where threshold detector 140 determines that the DMT signal to be transmitted exceeds a threshold value by a relatively slight amount, the duration of $T_2d$ may be reduced accordingly. Conversely, where threshold detector 140 determines that the DMT signal significantly exceeds a threshold value, e.g., having an amplitude around 20 volts, the duration of $T_2d$ may be lengthened. In this way, the length of $T_2d$ varies according to the actual length of time the particular DMT signal peak being considered will be above the threshold.

$T_2d$ may be determined prior to system implementation, e.g., empirically. Alternately, where $T_2d$ is a function of the amplitude of the DMT signal, $T_2d$ may be determined in real-time.

As has been shown, the system and method described above function such that delayed analog DMT signal 230 is normally driven in a low power state. However, when the system detects that a peak signal is to be delivered to line driver 130, voltage supplied to line driver 130 is significantly increased for a sufficient amount of time before and after the arrival of the peak signal at line driver 130. Thus, by utilizing the above described method and system, line driver 130 operates in a high power mode only when such operation is necessary to drive a peak DMT signal. Accordingly, power consumption is significantly decreased in comparison to known ADSL systems that operate continuously in high power mode.

Figure 6A:
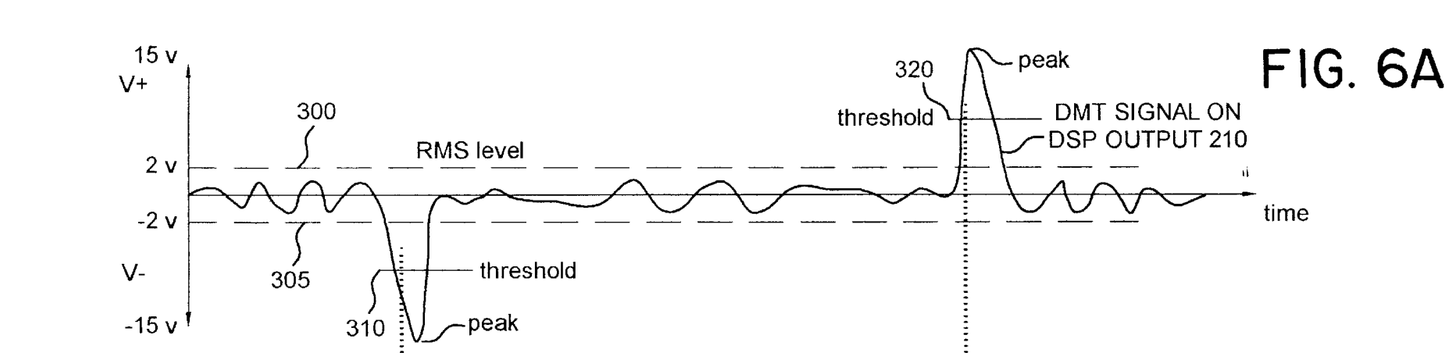
FIG. 6a is a signal waveform of a digital discrete multi-tone signal produced by the system of FIG. 1.
Figures 6B, 6C:
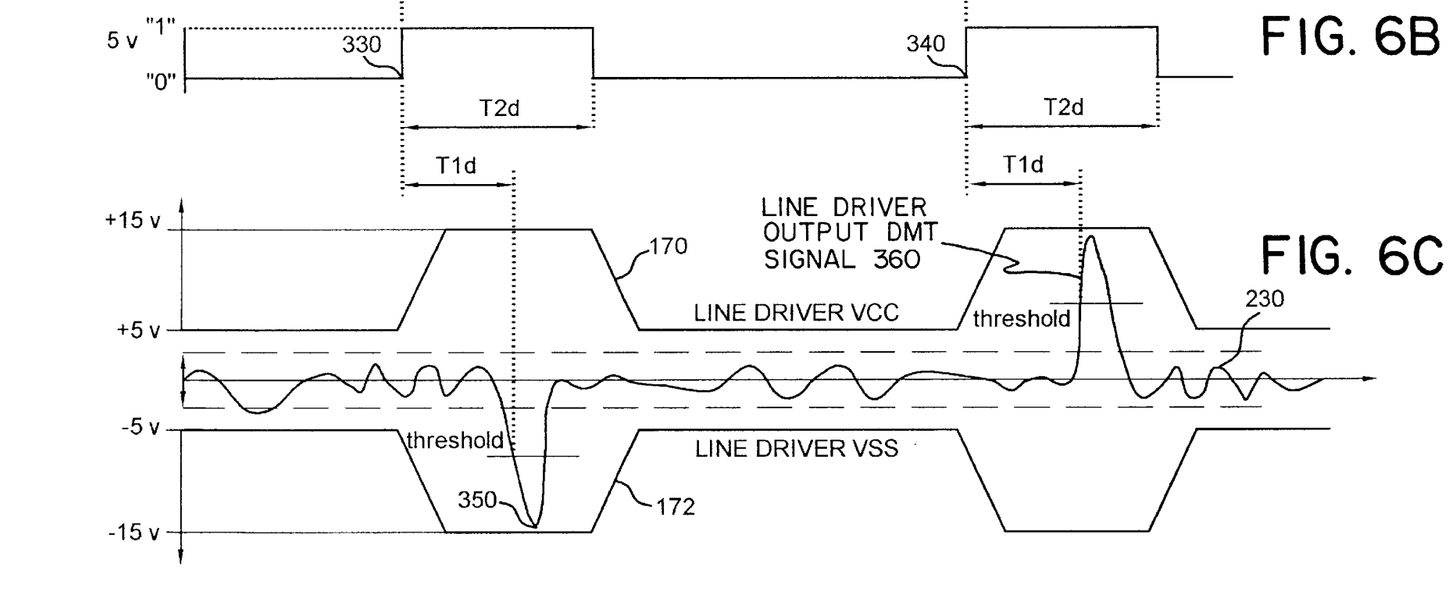
FIG. 6b is a signal waveform of a logic output signal produced by a threshold detector of the system of FIG. 1.
FIG. 6c illustrates signal waveforms of positive and negative voltage signals respectively applied to a line driver of the system of FIG. 1, and a signal waveform of a delayed analog discrete multitone signal produced by the system of FIG. 1.

Turning to FIGS. 6a–c and with continued reference to FIG. 1, therein is illustrated the time relationship of the various signals described above.

In FIG. 6a an exemplary digital DMT signal 210 is represented in analog form for ease of illustration as opposed to being represented in digital form. As is shown, digital DMT signal 210 on the output of the line driver is generally near the positive or negative of its RMS value (e.g.+2 volts) at 300 and 305 and exceeds a threshold value (e.g. half the amplitude of the peak signal) relatively infrequently (at 310 and 320 respectively) to peak at about ±15 volts.

Digital DMT signal 210 is monitored by threshold detector 140 which, as is shown by signal 250 in FIG. 6b, normally outputs a logic '0', i.e., 0 volts. Upon detecting threshold values 310 and 320, however, logic signal 250 outputs a logic '1',i.e.,5 volts, at 330 and 340 respectively. The duration of each logic '1'of logic signal 250 is equal to $T_2d$, and as shown, continues beyond the time period in which DMT signal 210 exceeds the preset threshold.

FIG. 6c represents the voltage signals of terminals 170 and 172 as they are supplied to line driver 130. As is shown, voltage signals 170 and 172 are responsive to a logic "1" being indicated by logic signal 250, i.e., voltage signals 170 and 172 enter their high power state when logic signal 250 is "1". Accordingly, the duration of the high voltage states as represented by voltage signals 170 and 172 of FIG. 6c approximates the duration of logic "1" of logic signal 250 of FIG. 6b, i.e., $T_2d$.

With continued reference to FIG. 6c, it is seen that the rise time of voltage signals 170 and 172 are relatively slow to account for the maximum rate of change which can be handled by line driver 130. Also, the peak of voltage signals 170 and 172 is delayed with respect to digital DMT signal 210, as discussed below.

FIG. 6c further illustrates delayed analog DMT signal 230. As is shown, the peaks of delayed analog DMT signal (350 and 360) corresponding to the peaks of DMT signal 210 as they arrive at line driver 130 after the voltage signals on terminals 170 and 172 have switched to high power mode. As is shown in FIG.6c, analog DMT signal 230 is delayed by time delay period $T_1d$.

Many modifications to the above method and system are possible. A filter may be added to the system illustrated in FIG. 1 between DSP 100 and threshold detector 140 to approximate the linear response of the DMT signal as the DMT signal travels from DSP 100 to line driver 130. In other words, the filter has a linear response equal to the system linear response between DSP 100 and line driver 130. In this way, logic signal 250 (i.e., the determination as to whether the DMT signal has reached a threshold value) more accurately reflects the characteristic of the DMT signal as that signal arrives in its analog form at line driver 130 (i.e., delayed analog DMT signal 230) as opposed to representing the characteristic of the DMT signal as that signal is delivered in its digital form by DSP 100. The time needed to perform this additional filtering must be added to the calculation of $T_1d$.

Further modifications include additional signal processing that may be performed, preferably, upon delayed digital DMT signal 220 or alternately upon digital DMT signal 210. The signal processing performed may include, e.g., interpolation and filtering. Using methods known in the art, a process of interpolation is performed upon the signal to ease the requirements of filtering which follows thereafter to lessen noise and shape the bandwidth of the signal. This additional processing is preferably performed after DDL 110, i.e., upon delayed digital DMT signal 220, so as not to increase the memory requirements of DDL 110. The time needed to perform this additional interpolation and filtering must be added to the calculation of $T_2d$.

When the above-mentioned additional signal processing is performed upon delayed digital DMT signal 220, linear distortion may be introduced into the DMT signal delivered to line driver 130. Accordingly, threshold detector 140 preferably includes a preliminary compensating filtering stage that compensates for the distortion. Any of the various methods known in the art for filtering a distorted digital signal may be utilized.

The varying power supplied on terminals 170 and 172 to line driver 130 may leak to the DMT signal output over communications connection medium 240 causing a noisy DMT signal to be transmitted. The leakage effectively limits the rate of change of the power signals supplied on terminals 170 and 172.

Figure 7:
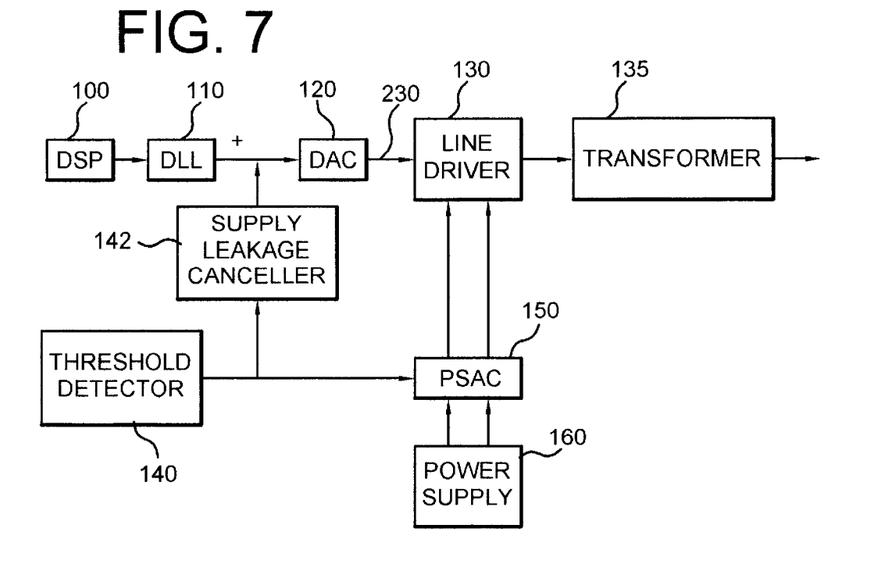
FIG. 7 is a block diagram of an alternative embodiment of the system illustrated in FIG. 1.

FIG. 7 describes a variation of the above described method and system which preprocesses the DMT signal to compensate for and effectively cancel noise caused by the leakage.

With reference to FIG. 7, a Supply Leakage Canceller ("SLC") 142 is shown disposed between the output of threshold detector 140 and the output of DDL 100. SLC 142 produces no signal output when logic signal 250 is in a normal state, i.e., 0 volts. However, when logic signal 250 is in the high power state, i.e., logic signal 250 has a value "1", SLC 142 produces a correction signal which is added to delayed digital DMT signal 220 to effectively compensate for the leakage created by the power supplied on terminals 170 and 172. SLC 142 is implemented digitally, preferably in DSP 100, and includes filters that produce correction signals based on the line driver's 130 response when power supplied to the line driver enters the high power state. Although FIG. 7 is represented as having a transformer 135 coupled to the output of line driver 130, it is understood that if the system of FIG. 7 is implemented using the PSAC 150 of FIG. 5, then transformer 135 is not necessary for purposes of providing increased voltage to the DMT signal delivered to communications medium 240.

Figure 8:
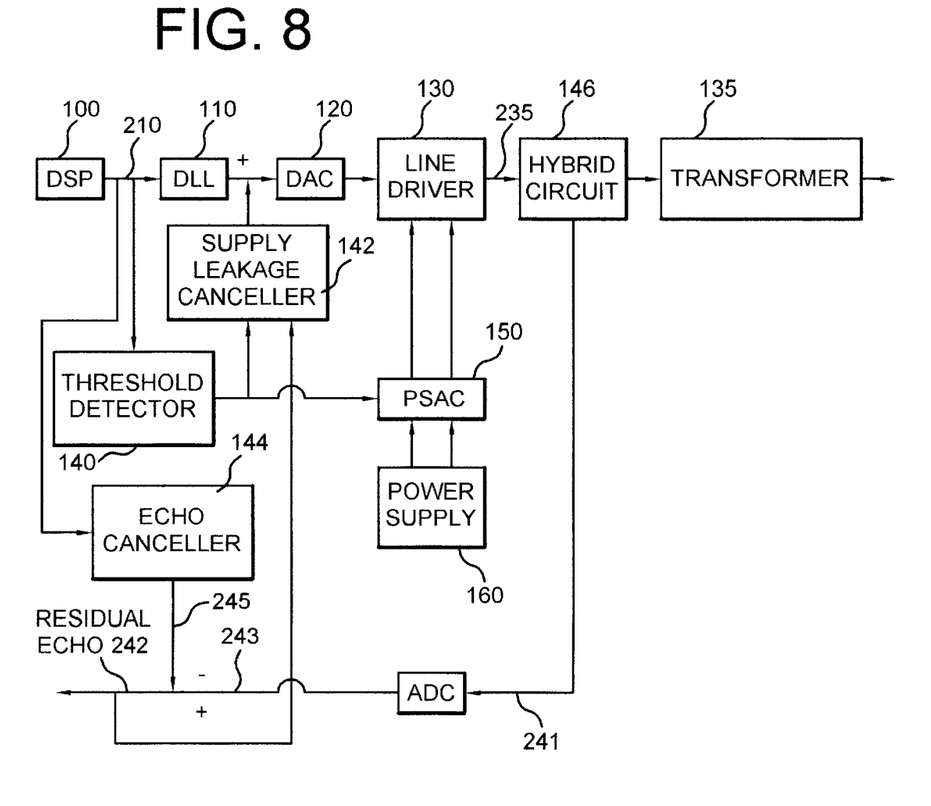
FIG. 8 is a block diagram of the system illustrated in FIG. 7.

FIG. 8 illustrates an alternative method and system of the embodiment illustrated in FIG. 7 wherein SLC 142 utilizes adaptive signal processing techniques to vary its parameters in real-time according to the response of line driver 130.

As shown in FIG. 8, an echo canceller 144 and a hybrid circuit 146, which are both known in the art and commonly used in communications modems, are utilized to provide a residual error signal 242 for use by SLC 142 in varying its parameters in accordance with the response of line driver 130.

Hybrid circuit 146 sends DMT signals transmitted from line driver 130 to transformer 135 for transmission over connection medium 240 and receives from communication connection medium 240 DMT signals obtained from a far-end DMT modem, as well as the echo signal of the transmitted DMT signal. The signals received by hybrid circuit 146 are referred to as received signal 241. As is shown in FIG. 8, received signal 241 is a feed back signal that is input into an analog-to-digital converter 196. Echo canceller 144 includes a filter with a response signal 245 that models the echo response of digital DMT signal 210. Echo response signal 245 is subtracted from digital received signal 243 to produce residual echo signal 242.

During operation of the system of FIG. 8, if no far end signal is present on communication media 240 and signal 235 output by line driver 130 is non-zero, received digital signal 243 includes the echo of signal 235 present at hybrid circuit 146. As explained above, echo canceller 144 is adapted to produce a signal 245 that is approximately equal to digital received signal 243. Accordingly, in this state, as shown in FIG. 8, residual echo signal 242 has a value of 0. However, when threshold detector 140 enters a high state causing an increased supply voltage to line driver 130 as described above, the supply voltage leaks to the signal transmitted on communications media 240 causing an echo which is transmitted back through hybrid circuit 146 and to residual echo signal 242 which will, therefore, include the components of the leakage, i.e., residual leakage. The residual leakage is used to adjust the parameters of SLC 142 in order to compensate for and reduce residual echo signal 242 to a minimum and, accordingly, to deliver a less noisy DMT signal to communications connection medium 240. Methods for estimating the parameters of SLC are known in the art. The adaptation of SLC 142 performed by the system of FIG. 8 may be accomplished even if a far-end signal is present on communications media 240 because the far end-signal has no effect on the leakage produced by the change in the voltage supplied by line driver 130.

In a variation of the above-described system and method of FIG. 8, rather than sample the echo of the transmittal DMT signal as received by hybrid circuit 146, the system may sample the output of the line driver 130, i.e., DMT signal 235, directly. The directly sampled signal 235 may thereafter be utilized to vary the parameters of SLC 142. By sampling DMT signal 235 directly, echo canceller 144 is not necessary and may be omitted. Accordingly, SLC 142 is periodically adjusted by zeroing DMT signal 230 and placing threshold detector 140 and, thus PSAC 150 into the high power state. Received digital signal 243 will then include only the residual echo present on communications media 240 caused by the increased voltage supplied to line driver 130 by PSAC 150. The parameters of SLC may thereafter be adjusted accordingly.

Although FIG. 8 is represented as having transformer 135 coupled to the output of hybrid circuit 146, it is understood that if the system of FIG. 8 is implemented using the PSAC of FIG. 5, then transformer 135 is not necessary for the purpose of providing increased voltage for transmission of the DMT signal over communications medium 240.

Figure 9:
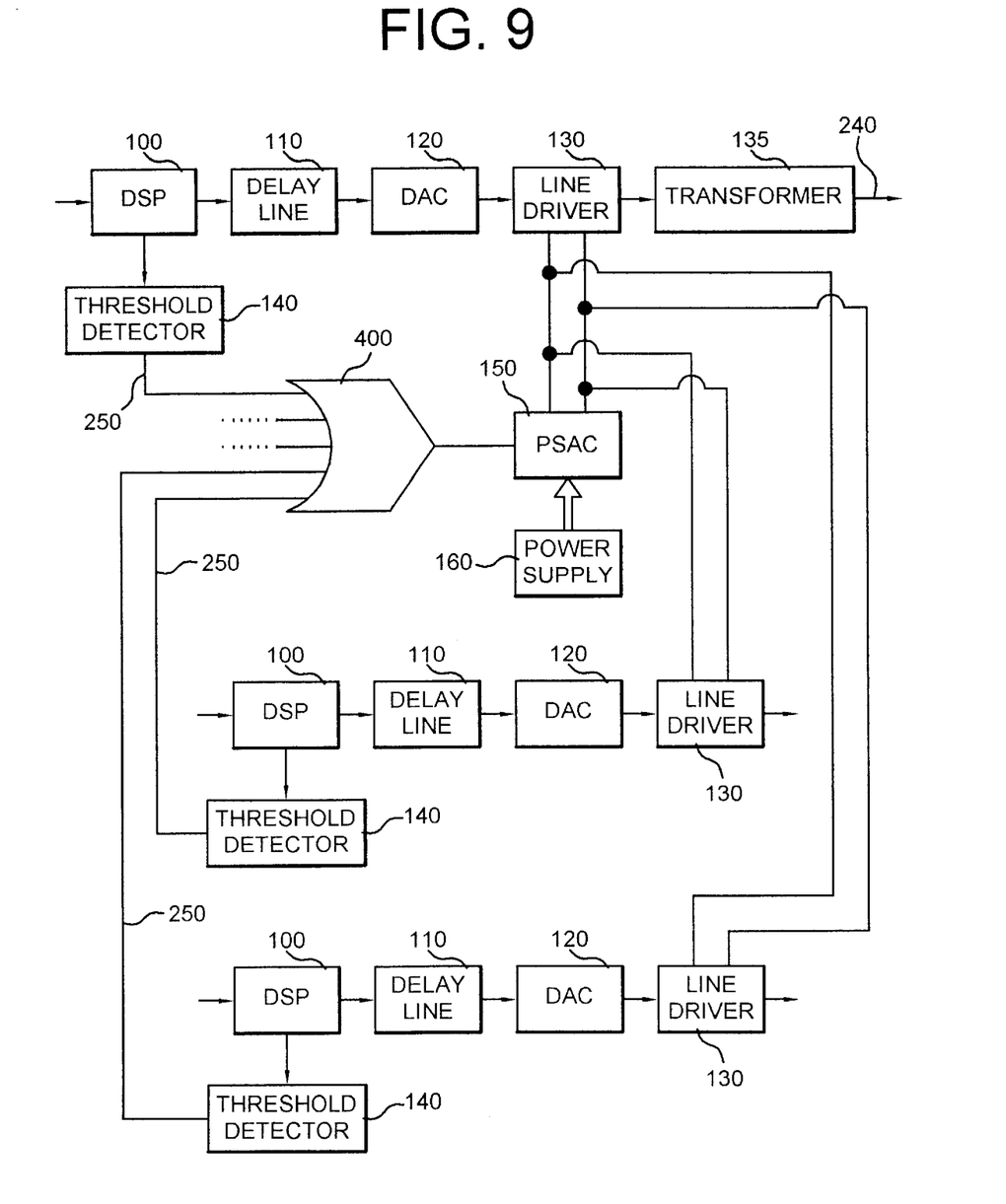
FIG. 9 is a block diagram of an alternative embodiment of the system illustrated in FIG. 1.

The above-described embodiments of FIGS. 1 through 8 include a power supply 160 to provide power to a single line driver 130. FIG. 9 represents an embodiment wherein a single power supply 160 provides power to multiple line drivers of multiple ADSL modems designed in accordance with the above-described embodiment.

As is shown in FIG. 9, the output of the multiple threshold detectors 140 are coupled to the input of an OR gate 400. The output of OR gate 400 is coupled to a single PSAC 150 which determines the power level supplied to all of the several line drivers 130. According to this embodiment, the detection of a threshold signal by any threshold detector 140 subsequently causes that threshold detector 140 to send a logic "1" as its logic signal 250 to the OR gate 400. As a result, PSAC 150 places all of the several line drivers 130 into a high power state. Because a DMT signal reaches a threshold value relatively infrequently, triggering the high power state of all the line drivers 130 each time a threshold value is reached for any one particular DMT signal does not significantly add to the power load consumed as compared to a system utilizing a single power supply 160 and PSAC 150 for each line driver 130, but advantageously decreases the overall complexity of the system.

The above described single-power-source/multiple-ADSL-modem embodiment is useful in telecommunications central office applications where multiple ADSL modems are needed in order to provide ADSL service to customers. Using the above described method and system, a single power supply can provide power to multiple ADSL modems mounted, e.g., on a single line card. Alternately, using the above described method and system, a single power supply can provide power to multiple ADSL modems mounted on multiple edge connector PCB boards. Using this alternate embodiment, the ADSL PCB-mounted modems are thereafter inserted into a power distribution backplane chassis where power supply 160 supplies power to all of the modems inserted in the chassis.

The above-described invention is not limited to ADSL modems and techniques, rather, it is understood that the present invention is applicable to any system or method which utilizes signals having a high voltage or power range. Furthermore, although a preferred embodiment has been disclosed for illustrative purposes, those skilled in the art will appreciate that many additions, modifications and substitutions are possible without departing from the scope and spirit of the invention, which is defined solely by the accompanying claims.

What is claimed is:

1. A method for reducing the power consumed by a line driver driving a signal to be transmitted through a communications medium comprising the steps of:
   (a) delaying said signal to produce a delayed signal;
   (b) determining whether said signal has reached a predetermined threshold value;
   (c) increasing power supplied to said line driver in response to said signal reaching said predetermined threshold value;
   (d) delivering said delayed signal to said line driver; and
   (e) reducing power supplied to said line driver after a predetermined time interval.

2. The method of claim 1, wherein said threshold value is between an root mean square RMS and a peak value of said signal.

3. The method of claim 1, wherein said delaying and said determining step commence substantially contemporaneously.

4. The method of claim 1, wherein said signal is delayed for a time period approximately equal to a time necessary to complete said determining and said increasing step.

5. The method of claim 1, wherein said determining step includes the steps of:
   (a) filtering and interpolating said signal; and
   (b) comparing said signal to said predetermined threshold value.

6. The method of claim 1, wherein said signal is a discrete multitone signal.

7. The method of claim 1, including the additional steps of:
   (f) producing a leakage error correction signal based on said power supplied to said line driver; and
   (g) subtracting said correction signal from said signal to be transmitted.

8. The method of claim 7, including the further steps of:
   (h) transmitting said delayed signal over a communications medium;
   (i) receiving from said communications medium an echo signal of said transmitted signal;
   (j) producing an echo response signal of said signal to be transmitted;
   (k) producing a residual signal based on said received signal of step (i) and said produced signal of step (j); and
   (l) adjusting said leakage error correcting signal produced at step (f) based on said residual signal produced at step (k).

9. The method of claim 1, including the additional steps of:
   (f) zeroing said signal to be transmitted;
   (g) increasing power supplied to said line driver;
   (h) receiving an echo signal from said communications media caused by said increased power of step (g);
   (i) producing a correction signal based on said echo signal of step (h); and
   (j) subtracting said correction signal of step (i) from said signal to be transmitted.

10. A method for reducing the power consumed by a plurality of line drivers, each driving a respective signal to be transmitted through a respective communications medium, comprising the steps of:
    (a) delaying each of said plurality of signals to produce a corresponding plurality of delayed signals;
    (b) determining whether any of said plurality of signals has reached a predetermined threshold value;
    (c) increasing power supplied to each of said line drivers in response to at least one of said plurality of signals reaching said predetermined threshold value; and
    (d) delivering each of said plurality of delayed signals to each of said line drivers;
    (e) reducing power supplied to each of said line drivers after a predetermined time interval.

11. The method of claim 10, wherein said delaying and said determining steps commence substantially contemporaneously.

12. A system for driving a discrete multitone signal over a communications medium comprising:
    (a) a digital signal processor having a signal output;
    (b) a line driver having a signal input, a signal output and one or more power inputs;
    (c) a power regulator having a control input, one or more power inputs and a plurality of power outputs;
    (d) a digital delay line disposed between the output of said digital signal processor and said signal input of said line driver;
    (e) a threshold detector disposed between said output of said digital signal processor and said control input of said power regulator;
    (f) a power supply having one or more powers outputs respectively connected to said one or more power inputs of said power regulator;
    (g) a digital-to-analog converter disposed between an output of said digital delay line and the signal input of said line driver;
    (h) a transformer having a signal input and a signal output, said signal input being connected to said signal output of said line driver.

13. The system of claim 12, wherein said digital delay line is implemented in RAM memory.

14. The system of claim 12, wherein said digital delay line is implemented by a filter.

15. The system of claim 12, wherein said digital delay line and said threshold detector are implemented in said digital signal processor.

16. The system of claim 12, wherein said threshold detector includes a preliminary stage compensating filter.

17. The system of claim 12, wherein said digital-to-analog converter is implemented in said digital signal processor.

18. The system of claim 12, wherein said power supply comprises a high power supply and a low power supply.

19. The system of claim 12, wherein said power regulator comprises:
    (a) a low pass filter having a signal input, a signal output and one or more power inputs;
    (b) an amplifier having a signal input, a signal output and one or more power inputs, said signal input coupled to said signal output of said low pass filter;
    (c) an inverter having a signal input, a signal output and one or more power inputs, said signal input coupled to the signal output of said amplifier;
    (d) a first and second transistor configured push-pull stage, each having a signal input, a signal output and one or more power inputs; the signal input of said first transistor configured push-pull stage coupled to the signal output of said amplifier and the signal input of said second transistor configured push-pull stage coupled to the signal output of said amplifier; and
    (e) said one or more outputs of said power supply connected to said one or more power inputs of said low pass filter; said amplifier, said inverter and said transistor configured push-pull stages.

20. The system of claim 12, wherein said power regulator comprises:
    (a) a switch having 4 input terminals and 2 output terminals, each of said input terminals being connected to one of said power supply power outputs; said power supply power outputs including:
       a positive high power supply connected to a first of said input terminals;
       a negative high power supply connected to a second of said input terminals;
       a positive low power supply connected to a third of said input terminals; and
       a negative low power supply connected to a fourth of said input terminals.

21. The system of claim 12, wherein said power regulator further comprises a switched capacitor selectively connectable to a power supply output of a first polarity for selectively increasing the voltage output of said power source when said threshold detector is in a high power state.

22. The system of claim 21, wherein said power regulator is further selectively connectable to ground for selectably decreasing the voltage output of said power source when said threshold detector is in a low power state.

23. The system of claim 21, wherein said power regulator is further selectively connectable to a power supply of a polarity opposite that of said first polarity for selectively decreasing the voltage output of said power source when said detector is in a low power state.

24. The system of claim 12, further including:
(i) a supply leakage canceller having a signal input and a signal output, said signal input receiving a signal from said threshold detector and said signal output being subtracted from the signal output by said digital delay line.

25. The system of claim 24, further including:
(j) a hybrid circuit having a signal output, a signal input and a signal feed back output, said signal input connected to said signal output of said line driver;
(k) an echo canceller having a signal input and a signal output, said signal input connected to the signal output of said digital signal processor;
(l) an analog to digital converter, said analog to digital converter having a signal input and a signal output, said signal input connected to the signal feedback output of said hybrid circuit and said signal output connected to the signal output of said echo canceller, said signal output of said echo canceller being subtracted from the signal output of said analog to digital converter to form a residual echo signal output;
(m) said supply leakage canceller having a feed back signal input, said feed back signal input connected to said residual echo signal output.

26. A system for driving a discrete multitone signal over a communications media comprising:
(a) a digital signal processor, said digital signal processor outputting said discrete multitone signal at a signal output of said digital signal processor;
(b) a digital delay line coupled to the signal output of said digital signal processor and to the input of a digital-to-analog converter, said digital delay line receiving said discrete multitone signal in digital form from said digital signal processor and delivering a delayed version of said digital signal to said digital-to-analog converter;
(c) said digital-to-analog converter receiving the delayed version of said digital signal and delivering an analog version of the digital signal to a line driver;
(d) a threshold detector coupled to the signal output of said digital signal processor and a control input of a power regulator, said threshold detector receiving said discrete multitone signal from said digital signal processor and delivering to the control input of said regulator an indication signal indicating whether said discrete multitone signal has reached said threshold value;
(e) said power regulator coupled to a power supply and to one or more power inputs of said line driver, said power regulator normally providing said line driver with a low power source and upon receiving at said control input said indication signal from said threshold detector, supplying said line driver with a high power source; and
(f) said line driver coupled to said power regulator and to an output of said digital to analog converter, said line driver driving said analog discrete multitone signal at a power determined by said indication signal;
(g) a transformer having a signal input, said signal input coupled to a signal output of said line driver.

27. A system for driving a signal over a communications medium, comprising:
(a) means for producing said signal;
(b) means for detecting and indicating whether said signal has reached a predetermined threshold;
(c) means for providing a power source that produces, for a predetermined time interval, an increased power level in response to said indication from said detecting means;
(d) means for delaying said signal;
(e) means for driving said signal using said power source means; and
(f) means for delivering said delayed signal to said driving means.

28. The system of claim 27 further comprising:
(g) means for producing a leakage error correction signal based on said power source means; and
(h) means for subtracting said correction signal from said signal.

29. The system of claim 27, further comprising:
(g) means for receiving from said communications medium an echo of said driven signal;
(h) means for reproducing an echo response signal of said signals;
(i) means for producing a residual signal;
(j) means for adjusting said leakage error correcting signal based on said residual signal.

* * * * *